: 3,562,789
Patented Feb. 9, 1971

3,562,789
MONOAZODYESTUFFS CONTAINING A 3-N-(β-HY-
DROXY- α - CYCLOHEXYLOXY OR ARYLOXY)
PROPYLAMINO-4-ALKOXY-ALRANOYLANILIDE
GROUP
Tsutomu Sasa, Matahiko Asahi, Takanobu Kunihiro, and
Hitoshi Takizuka, Ohmuta-shi, Japan, assignors to
Mitsui Toatsu Chemicals, Inc., Tokyo, Japan, a corporation of Japan
No Drawing. Filed Aug. 7, 1967, Ser. No. 658,625
Claims priority, application Japan, Aug. 12, 1966,
41/52,933; Sept. 21, 1966, 41/62,443
Int. Cl. C09b 29/00, 29/36
U.S. Cl. 260—207                              12 Claims

ABSTRACT OF THE DISCLOSURE

A water-insoluble monoazodyestuff having the formula:

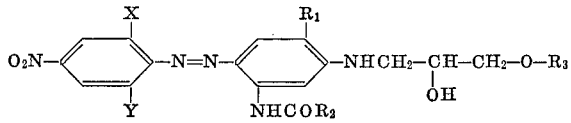

wherein X is a member of the group consisting of chlorine, bromine, cyano and nitro; Y is a member of the group consisting of hydrogen, nitro and alkoxy having 1 to 3 carbon atoms; $R_1$ is methoxy or ethoxy; $R_2$ is methyl or ethyl; and $R_3$ is cyclohexyl, phenyl or p-tolyl. These dyestuffs are suitable for dyeing polyesters, polyamide acetate or triacetate to give dyeings which are fast to sublimation, light and wet treatment.

---

The present invention relates to a water-insoluble monoazodyestuff of the formula:

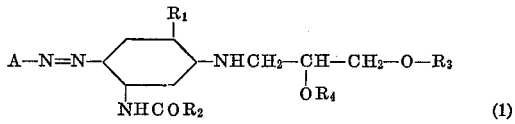

wherein A is an amine residual group selected from the class consisting of an amine residual group of unsubstituted 2-aminobenzothiazole, an amine residual group of 2-aminobenzothiazole having a substituent at 6-position, an amine residual group of 2-aminothiazole having a substituent at 5-position and an amine residual group of an amine of the formula

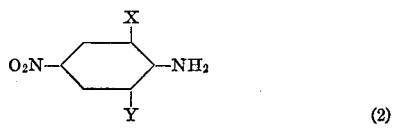

wherein X is selected from the class consisting of hydrogen atom, chlorine atom, bromine atom, cyano group and nitro group, and Y is selected from the class consisting of hydrogen atom, chlorine atom, bromine atom, trifluoromethyl group, an alkyl group having 1–3 carbon atoms, hydroxyl group, an alkoxy group having 1–3 carbon atoms and nitro group, $R_1$ is a group selected from the class consisting of methoxy group and ethoxy group, $R_2$ is a group selected from the class consisting of methyl group, ethyl group and phenyl group, $R_3$ is a group selected from the class consisting of an alkyl group having 1–4 carbon atoms, an alkenyl group having 2–4 carbon atoms, cyclohexyl group, phenyl group which may be substituted, and $R_4$ is selected from the class consisting of hydrogen, acetyl group and propionyl group, and a process for the production thereof and a process for dyeing using said dyestuff.

The water-insoluble monoazodyestuff shown in said Formula 1 of the present invention is suitable for dyeing synthetic fibers or semisynthetic fibers such as polyester, polyamide acetate or triacetate.

This dyestuff of the present invention is obtained by coupling a diazotized compound of an amine represented by the formula $$A\text{—}NH_2 \qquad (3)$$

wherein A is same as defined in said Formula 1 and coupling the diazotized amine with a coupling component represented by the formula

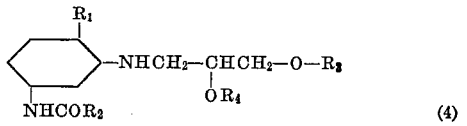

wherein $R_1$, $R_2$, $R_3$ and $R_4$ are same as defined in said Formula 1. Or the dyestuff compound of the present invention of said Formula 1 wherein $R_4$ is acetyl group or propionyl group is obtained by treating the compound of said Formula 1 wherein $R_4$ is hydrogen, namely:

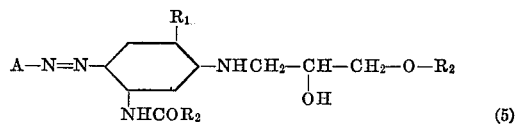

wherein A, $R_1$, $R_2$, $R_3$ and $R_4$ are same as defined in said Formula 1 with a corresponding acylating agent.

As examples of an amine represented by the general formula A—NH$_2$, 2-aminobenzothiazole, 6-methoxy-2-aminobenzothiazole, 6 - nitro - 2 - aminobenzothiazole, 6-methylsulfonyl - 2 - aminobenzothiazole, 5-nitro-2-aminothiazole, 4-nitroaniline, 2-chloro-4-nitroaniline, 2-methyl-4 - nitroaniline, 2 - trifluoromethyl - 4 - nitroaniline, 2 - methoxy - 4 - nitroaniline, 2 - cyano - 4 - nitroaniline, 2,4-dinitroaniline, 2,6 - dichloro-4-nitroaniline, 2,4-dinitro-6-bromoaniline, 2,4-dinitro-6-cyanoaniline, 2-cyano-4-nitro-6-bromoaniline and 2-hydroxy-4-nitroaniline may be cited.

Diazotization of an amine is achieved by an ordinary process using a mineral acid and sodium nitrite, a process using nitrosyl sulfuric acid or a process using nitrosyl sulfuric acid and an organic acid. Coupling is carried out in water or an organic solvent at pH of below about 7. Acylation of the monoazo compound represented by the general Formula 5 is completed by heating the monoazo dyestuff and an acylating agent such as acetic anhydride and propionic anhydride in the presence of an organic solvent for several hours.

It is proper to use the so obtained dyestuff compound for dyeing in a finely dispersed state attained by milling said compound by a known process with water and a proper dispersing agent. As a dispersing agent, there are a condensate of naphthalene-β-sulfonic acid and formaldehyde, an alkali metal salt of lignin sulfonic acid or a condensate of cresol, formaldehyde and sodium sulfite.

Polyester fiber is dyed by maintaining it under pressure at 130° C. for 60 minutes in a liquid obtained by dispersing a finely ground dyestuff in water or by maintaining it at 98–100° C. for 60 minutes in a dye bath containing said dyestuff dispersion together with a carrier such as trichlorobenzene, paraphenylphenol or methyl naphthalene. Polyamide is dyed by maintaining it at 90–100° C. for 60 minutes in a liquid obtained by dispersing the finely ground dyestuff in water. Acetate fiber or triacetate fiber is dyed by maintaining it at 60–85° C. for 40–60 minutes in a liquid obtained by dispersing the finely ground dyestuff in water. Upon dyeing of these fibers it is preferable to add a surface active agent to the dye bath in order to help disperse the dyestuff. The so obtained shade is fast to light, sublimation and wet treatment.

The present invention will be explained by examples hereinbelow. Parts in examples are parts by weight.

EXAMPLE 1

To 26.2 parts of 2,4-dinitro-6-bromoaniline dissolved in 50 parts of a concentrated sulfuric acid, 100 parts of nitrosyl sulfuric acid prepared from 7 parts of sodium nitrite and 93 parts of a concentrated sulfuric acid was added dropwise at 75–80° C. for 1 hour in carrying out diazotization.

32.4 parts of 3-N-(β-hydroxy-γ-butoxy) propylamino-4-ethoxyacetanilide was dissolved in a mineral acid, the resultant solution was cooled to 0° C. by adding ice thereto and said diazo solution was further added thereto. The resultant mixed solution was stirred for an hour, thereafter filtered and washed with water to obtain a dyestuff of the following formula.

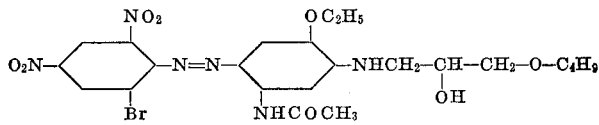

This dyestuff dyed polyester fiber in a blue shade fast to sublimation and wet treatment and dyed acetate in a greenish blue shade.

EXAMPLE 2

To 100 parts of nitrosyl sulfuric acid prepared from 7 parts of sodium nitrite and 93 parts of a concentrated sulfuric acid, 100 parts of glacial acetic acid was added at 5–10° C., thereafter 16.3 parts of 2-cyano-4-nitroaniline was added to the resultant mixed solution at a temperature below 15° C., the resultant mixed solution was stirred for 2 hours in carrying out diazotization.

28.2 parts of 3 - N - (β - hydroxy-γ-methoxy) propylamino-4-ethoxyacetanilide was dissolved in a mineral acid, the resultant solution was cooled to 0° C. by adding ice thereto and said diazo solution was further added thereto. The resultant solution was stirred for 1 hour, filtered and washed with water to obtain a dyestuff of the following formula.

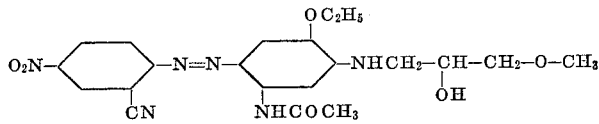

This dyestuff dyed polyester fiber in a reddish blue shade fast to sublimation and wet treatment and dyed acetate fiber in a similar reddish blue shade.

EXAMPLE 3

According to the conventional process, 13.8 parts of 4-nitroaniline was diazotized by sodium nitrite in a diluted hydrochloric acid under cooling the reaction system with ice.

To 34.4 parts of 3-N-(β-hydroxy-γ-phenoxy) propylamino-4-ethoxyacetanilide dissolved in methanol, said diazo solution kept at 0° C. was added in carrying out coupling. The resultant mixed solution was stirred for 1 hour and washed with water to obtain a dyestuff of the following formula.

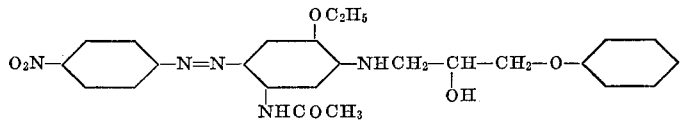

This dyestuff dyed polyester fiber in a bluish red shade which was fast to sublimation and wet treatment.

EXAMPLE 4

18 parts of 6-methoxy-2-aminobenzothiazole was dissolved in 50 parts of a 30% sulfuric acid, the resultant solution was poured onto 440 parts of a 55% sulfuric acid at a temperature below 5° C. To the obtained solution, 100 parts of nitrosyl sulfuric acid prepared from 7 parts of sodium nitrite and 93 parts of a concentrated sulfuric acid was added dropwise for 1.5 hours in carrying out diazotization.

30.8 parts of 3-N-(β-hydroxy-γ-allyloxy) propylamino-4-ethoxyacetanilide dissolved in a mineral acid was cooled to 0° C. by adding ice thereto. Into this solution said diazo solution diluted in ice water was poured in carrying out coupling. As a result a dyestuff of the following formula was obtained.

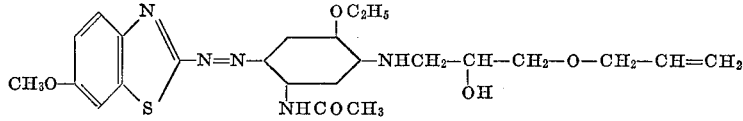

This dyestuff dyed polyester fiber in a reddish violet shade which was fast to sublimation and wet treatment.

EXAMPLE 5

In Example 4, by using 5-nitro-2-aminothiazole instead of 6-methoxy - 2 - aminobenzothiazole, a dyestuff dyeing polyester fiber in a greenish blue shade was obtained.

EXAMPLES 6–18

Various dyestuffs represented by said Formula 5 of the present invention were used in dyeing polyester fiber. The shades on the fiber in respective cases were shown in Table 1.

TABLE 1

| Example | Diazo component shown by said Formula 2 | | Coupling component | | | Shade on polyester fiber |
|---|---|---|---|---|---|---|
| | X | Y | $R_1$ | $R_2$ | $R_3$ | |
| 6 | Hydrogen | Hydrogen | Methoxy | Methyl | n-Butyl | Bluish red. |
| 7 | do | do | do | do | Phenyl | Do. |
| 8 | Chlorine | do | do | do | Methyl | Do. |
| 9 | Hydrogen | Methyl | Ethoxy | do | n-Butyl | Do. |
| 10 | do | Trifluoromethyl | do | do | do | Violet. |
| 11 | Nitro | Hydrogen | do | do | Methyl | Do. |
| 12 | Cyano | do | do | do | n-Butyl | Do. |
| 13 | Nitro | Bromine | do | do | Allyl | Blue. |
| 14 | Cyano | Nitro | do | do | n-Butyl | Do. |
| 15 | do | Bromine | do | Ethyl | Methyl | Greenish blue. |
| 16 | Hydrogen | Hydrogen | do | Phenyl | do | Bluish red. |
| 17 | Nitro | Bromine | do | Methyl | p-Tolyl | Blue. |
| 18 | do | do | do | do | Cyclohexyl | Do. |

EXAMPLE 19

In 50 parts of a concentrated sulfuric acid, 26.2 parts of 2,4-dinitro-6-bromoaniline was dissolved, to the obtained solution 100 parts of nitrosyl sulfuric acid prepared from 7 parts of sodium nitrite and 93 parts of a concentrated sulfuric acid was added dropwise at 75–80° C. for 1 hour in carrying out diazotization.

32.4 parts of 3-N-(β-acetoxy-γ-methoxy) propylamino-4-ethoxyacetanilide dissolved in a diluted acetic acid was cooled to 0° C. by adding ice thereto, to which the diazo solution obtained above was added. The resultant mixture was stirred for 3 hours and filtered thereby a dyestuff of the following formula was obtained.

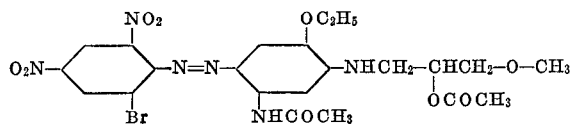

This dyestuff dyed polyester fiber in a reddish blue shade fast to sublimation and wet treatment, dyeing similarly acetate fiber in a blue shade.

EXAMPLE 20

To 100 parts of nitrosyl sulfuric acid prepared from 7 parts of sodium nitrite and 93 parts of a concentrated sulfuric acid, 100 parts of glacial acetic acid was added, to the obtained mixture 16.3 parts of 2-cyano-4-nitroaniline was added at a temperature below 15° C., the entire mixture was stirred for 2 hours thereby carrying out diazotization.

In a diluted acetic acid, 33.8 parts of 3-N-(β-acetoxy-γ-ethoxy) propylamino-4-ethoxyacetanilide was dissolved, the obtained solution was cooled to 0° C. by adding ice thereto, to which the diazo solution obtained above was added. The resultant mixed solution was stirred for 3 hours thereby a dyestuff of the following formula was obtained.

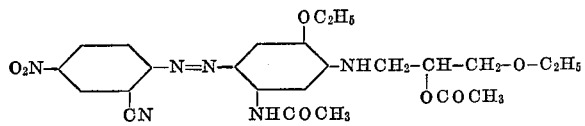

This dyestuff dyed polyester fiber in a bluish violet shade which was fast to sublimation and wet treatment. This dyestuff dyed similarly acetate fiber in a bluish violet shade.

EXAMPLE 21

In accordance with the conventional process, 13.8 parts of 4-nitroaniline was diazotized by hydrochloric acid and sodium nitrite.

In a diluted acetic acid, 35.2 parts of 3-N-(β-acetoxy-γ-butoxy) propylamino-4-methoxyacetanilide was dissolved, the obtained solution was cooled to 0° C. by adding ice thereto, to which the diazo solution obtained above was added, the entire solution was stirred for 1 hour in carrying out coupling. The coupled solution was filtered and washed with water thereby a dyestuff of the following formula was obtained.

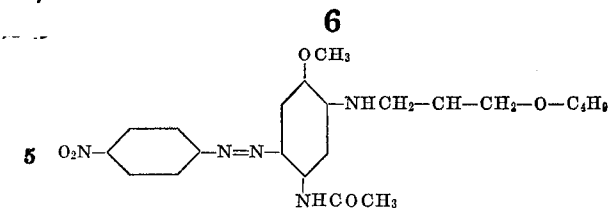

This dyestuff dyed polyester fiber in a bluish red shade which was fast to sublimation and wet treatment.

EXAMPLE 22

Then parts of powder of a dyestuff of the following formula

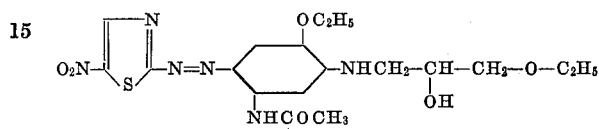

was dissolved in 50 parts of acetic anhydride and the obtained solution was maintained at 90–95° C. for 3 hours. A dyestuff of the following formula was obtained.

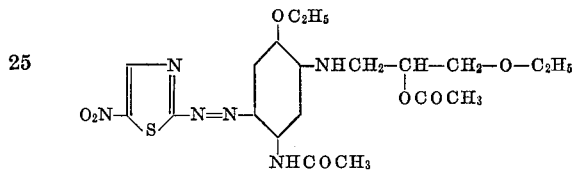

This dyestuff dyed polyester fiber in greenish blue shade which was fast to sublimation and wet treatment.

EXAMPLE 23

Ten parts of a dyestuff of the following formula

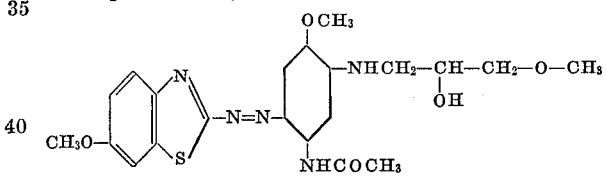

was dissolved in 40 parts of propionic anhydride, the obtained solution was maintained at 110° C. for 3 hours, thereby a dyestuff of the following formula was obtained.

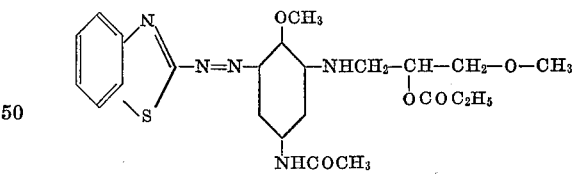

This dyestuff dyed polyester fiber in a bluish red shade which was fast to sublimation and wet treatment.

EXAMPLES 24–33

Various dyestuffs represented by said general Formula 1 of the present invention were used in dyeing polyester fiber. The shades on the fiber in respective cases were shown in Table 2.

TABLE 2

| Ex: | Diazo component shown in said Formula 2 | | Coupling component | | | | Shade on polyester fiber |
|---|---|---|---|---|---|---|---|
| | X | Y | $R_1$ | $R_2$ | $R_3$ | $R_4$ | |
| 24 | Hydrogen | Chlorine | Ethoxy | Methyl | Methyl | Acetyl | Red violet. |
| 25 | Cyano | Hydrogen | do | do | do | Propionyl | Bluish violet. |
| 26 | Hydrogen | Trifluoromethyl | do | do | do | Acetyl | Red violet. |
| 27 | Nitro | Bromine | Methoxy | do | Ethyl | Propionyl | Reddish blue. |
| 28 | Cyano | Nitro | do | do | do | Acetyl | Blue. |
| 29 | do | do | Ethoxy | Methyl | Butyl | do | Greenish blue. |
| 30 | Hydrogen | Methyl | do | Ethyl | Phenyl | do | Red. |
| 31 | do | Hydrogen | Methoxy | do | Cyanohexyl | do | Bluish red. |
| 32 | do | do | Ethoxy | Phenyl | Methyl | do | Do. |
| 33 | do | Methoxy | do | Methyl | Butyl | do | Do. |

EXAMPLE 34

In a dye bath consisting of 0.1 part of a finely ground dyestuff obtained by milling 25 parts of a dyestuff of the following formula obtained in Example 2

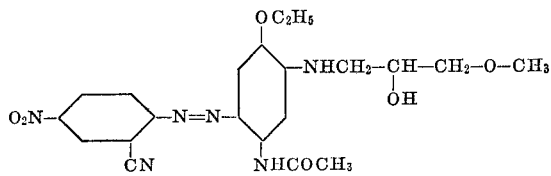

together with 75 parts of sodium lignin sulfonate (trade name: Sanex NB), 150 parts of water and 0.15 part of nonionic surface active agent (trade name: Disper-TL), 5 parts of polyethylene terephthalate yarn was immersed and maintained at 130° C. under pressure for 60 minutes, thereafter said yarn was taken out and treated at 70-80° C. for 10 minutes with a liquid wherein 2 g. of caustic soda, 2 g. of hydrosulfite and 2 g. of a cleaning agent (trade name: Scoreroll) were dissolved in 1 liter of water, thereby reducing and washing said yarn, further, washing and rinsing said yarn with water and dried. A reddish blue dyeing was obtained which had excellent fastness to sublimation.

EXAMPLE 35

In a dye bath containing 0.1 part of a finely ground dyestuff obtained by milling 25 parts of a dyestuff of the formula

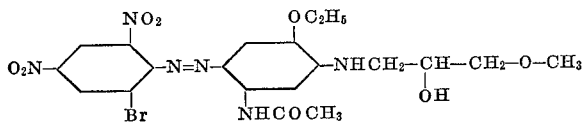

together with 75 parts of a naphthalene-β-sulfonic acid-formaldehyde condensate (trade name: Demole N), 150 parts of water, 0.15 part of Disper-TL and 0.75 part of trichlorobenzene, 5 parts of polyetheylene terephthalate yarn was immersed, maintained at 98-100° C. for 60 minutes, thereafter reduced and washed as in Example 34, then rinsed and dried. Blue dyeing which had excellent fastness to sublimation was obtained.

EXAMPLE 36

In a dye bath consisting of 0.1 part of a finely ground dyestuff obtained by milling 20 parts of a dyestuff of the formula

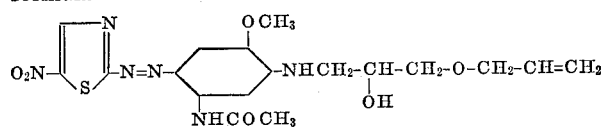

together with 80 parts of Demole N, 200 parts of water and 0.2 part of a nonionic surface active agent (trade name: Monogen), 5 parts of acetate fabric was immersed, maintained at 85° C. for 45 minutes, thereafter taken out, rinsed and dried. Greenish blue dyeing which had excellent fastness to washing was obtained, said dyeing being able to be white dischargeable by stannous chloride.

EXAMPLE 37

In a dye bath consisting of 0.1 part of the finely ground dyestuff of Example 35, 200 parts of water and 0.2 part of Disper-TL, 5 parts of nylon yarn was immersed, maintained at 100° C. for 60 minutes, thereafter taken out, washed with a 2% Monogen aqueous solution, rinsed and dried. Greenish dark dyeing which had excellent fastness to sublimation was obtained.

EXAMPLES 38–44

Other various dyestuffs represented by said general Formula 5 of the present invention were used in dyeing polyester fiber by a dyeing process same as in Example 34. The shades on the fiber were shown in Table 3. The obtained dyeings had excellent fastness to sublimation.

TABLE 3

| | Diazo component shown in said Formula 2 | | Coupling component | | | Shade on polyester fiber |
|---|---|---|---|---|---|---|
| Example: | X | Y | $R_1$ | $R_2$ | $R_3$ | |
| 38 | Hydrogen | Chlorine | Ethoxy | Methyl | Methyl | Red violet. |
| 39 | Cyano | Hydrogen | do | Ethyl | do | Reddsih blue. |
| 40 | Hydrogen | Trifluoromethyl | do | Methyl | Ethyl | Red violet. |
| 41 | Nitro | Bromine | Methoxy | do | do | Blue. |
| 42 | Cyano | Nitro | do | Ethyl | do | Do. |
| 43 | Hydrogen | Hydrogen | do | do | Cyclohexyl | Bluish red. |
| 44 | do | do | Ethoxy | Phenyl | Methyl | Do. |

What is claimed is:

1. A water-insoluble monoazo dyestuff having the formula:

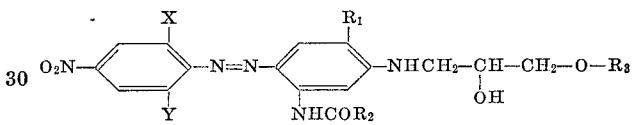

wherein X is a member of the group consisting of chlorine, bromine, cyano and nitro; Y is a member of the group consisting of hydrogen, nitro and alkoxy having 1 to 3 carbon atoms; $R_1$ is methoxy or ethoxy; $R_2$ is methyl or ethyl; and $R_3$ is cyclohexyl, phenyl or p-tolyl.

2. An azo dye according to claim 1 having the formula:

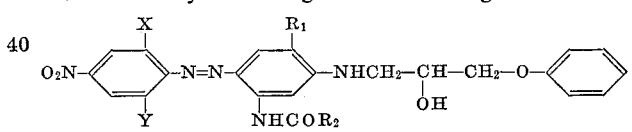

wherein X is chlorine, bromine, cyano, or nitro; Y is nitro or alkoxy having 1 to 3 carbon atoms; and $R_1$ and $R_2$ are as hereinbefore defined.

3. An azo dye according to claim 1 having the formula:

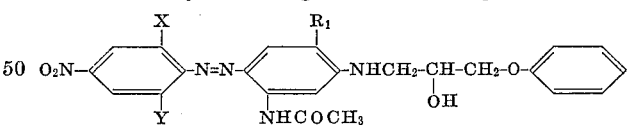

wherein X, Y, and $R_1$ are as hereinbefore defined.

4. An azo dye according to claim 1 having the formula:

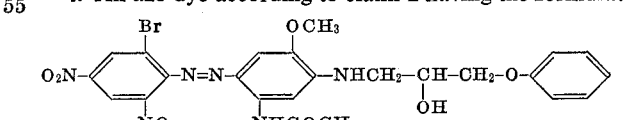

5. An azo dye according to claim 1 having the formula:

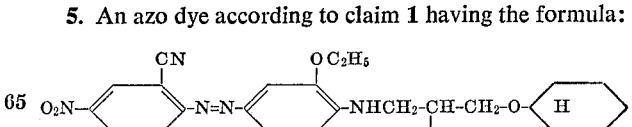

6. An azo dye according to claim 1 having the formula:

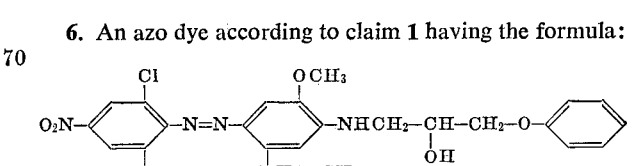

7. An azo dye according to claim 1 having the formula:

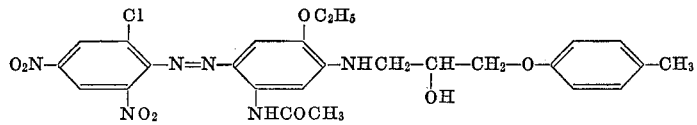

8. An azo dye according to claim 1 having the formula:

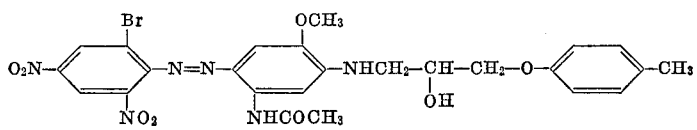

9. An azo dye according to claim 1 having the formula:

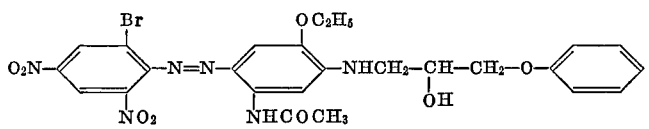

10. An azo dye according to claim 1 having the formula:

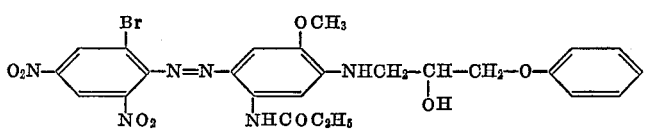

11. An azo dye according to claim 1 having the formula:

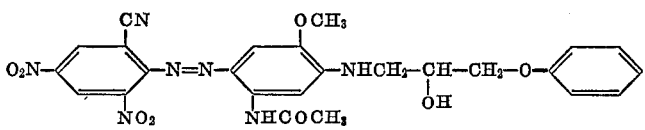

12. An azo dye according to claim 1 having the formula:

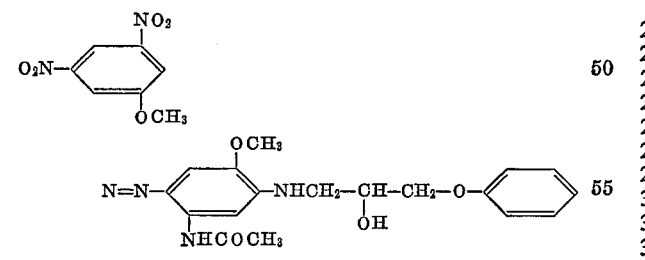

References Cited
UNITED STATES PATENTS

| | | | |
|---|---|---|---|
| 2,083,308 | 6/1937 | Senn | 260—207 |
| 2,336,275 | 12/1943 | McNally et al. | 260—207X |
| 2,386,599 | 10/1945 | Dickey et al. | 260—207X |
| 2,475,228 | 7/1949 | Felix et al. | 260—207X |
| 2,659,719 | 11/1953 | Dickey et al. | 260—158 |
| 2,683,708 | 7/1954 | Dickey et al. | 260—158 |
| 2,683,709 | 7/1954 | Dickey et al. | 260—158 |
| 3,272,791 | 9/1966 | Moore et al. | 260—158X |
| 3,428,622 | 2/1969 | Altermatt et al. | 260—207 |
| 3,442,886 | 5/1969 | Dickey et al. | 260—158 |

FLOYD D. HIGEL, Primary Examiner

U.S. Cl. X.R.

8—4, 41; 117—138.8; 260—37, 158, 490, 562